United States Patent

Clark et al.

[15] 3,649,096
[45] Mar. 14, 1972

[54] METHOD FOR MAKING HERMETICALLY SEALED ENVELOPES

[72] Inventors: Randall D. Clark, Dallas; Charles V. Cornman, Richardson; Ralph E. McCullough, Garland, all of Tex.

[73] Assignee: Texas Instruments Incorporated, Dallas, Tex.

[22] Filed: Mar. 18, 1968

[21] Appl. No.: 731,353

Related U.S. Application Data

[62] Division of Ser. No. 494,508, Oct. 11, 1965, abandoned.

[52] U.S. Cl. ..................316/25, 250/42, 250/106, 313/175, 316/26
[51] Int. Cl. ..................H01j 7/18, H01j 17/26
[58] Field of Search ..................316/25, 26; 250/42, 43, 106, 250/106 T; 34/15; 313/175, 179; 73/52

[56] References Cited

UNITED STATES PATENTS 3,083,320  3/1963  Godfrey et al..................313/179

OTHER PUBLICATIONS

Linder, abstract of application Serial No. 90,9331, published Feb. 27, 643 O.G. 1333.

*Primary Examiner*—Charlie T. Moon
*Assistant Examiner*—Robert J. Craig
*Attorney*—Samuel M. Mims, Jr., James O. Dixon, Andrew M. Hassell, Harold Levine, John E. Vandigriff, Rene E. Grossman and Virgil Lawrence Sewell

[57] ABSTRACT

A method for fabricating hermetically sealed packages comprising placing a getter material within and hermetically sealing the package, subjecting the package to radioactive tracer gas, air washing, and finally leak testing to determine any package leakage.

5 Claims, 3 Drawing Figures

Randall D. Clark
Charles V. Cornman
Ralph E. McCullough
INVENTORS

BY [signature]

ATTORNEY

Randall D. Clark
Charles V. Cornman
Ralph E. McCullough
INVENTORS

BY Gerald B. Epstein
ATTORNEY

Randall D. Clark
Charles V. Cornman
Ralph E. McCullough
INVENTORS

BY Gerald B. Epstein

ATTORNEY

METHOD FOR MAKING HERMETICALLY SEALED ENVELOPES

This is a division of application Ser. No. 494,508, filed Oct. 11, 1965, now abandoned.

This invention relates to hermetically sealed envelopes, and to methods for fabricating articles to detect improper heremetic seals. More particularly, the invention relates to the utilization of a radioactive gas-entrapping getter material as a means of hermetic seal leak detection.

Gross leaks in hermetically sealed articles are defined as those having leak rates greater than $1 \times 10^{-5}$ atm. cc./sec., whereas fine leaks have a lesser rate. While there have been various methods used for leak detection, a thorough examination for leaks has included a separate test for the fine and the gross leaks, and even then, each such test has its own disadvantages.

The problem which has plagued the prior art has been that of dual testing, i.e., the gross leak test has necessarily been separate from the fine leak test. For example, in the helium leak test, wherein the articles, such as transistors, are placed in a chamber of pressurized helium, the helium detection machine will not indicate gross leaks, because all of the helium will have escaped from the larger aperture before it can be detected. Likewise, devices have been subjected to a bombardment of pressurized radioactive tracer gas, but the gas particles often escape before the device is placed in a counting mechanism or in proximity thereto.

It is therefore an object of the invention to provide a hermetically sealed article of manufacture which can be subjected to a single radioactive gas test to determine if the article is properly sealed.

It is another object of the invention to provide an improved method of fabricating and testing a hermetically sealed article of manufacture to determine if the article is properly sealed.

It is still another object of the invention to provide a single method for hermetic seal leak detection of semiconductor devices.

In accordance with these and other objects, features, and improvements, an article of manufacture, for example, a transistor, includes a hermetically sealed envelope enclosing the transistor and a radioactive gas-entrapping getter material disposed inside the envelope. After the envelope is sealed, it is subjected to a pressurized radioactive gas, such as radioactive Krypton 85. If the structure does not have an adequate hermetic seal, the gas will enter the envelope and will be entrapped in the getter material. The transistor is then placed in proximity to a scintillation counter, and the pressurized radioactive gas particles (gammas) can be counted radiating through the walls of the envelope, the getter material making it possible to maintain the gas flow rate under control.

The novel features believed to be characteristic of the invention are set forth in the appended claims. The invention itself, however, as well as other objects, features and advantages thereof may best be understood with reference to the following detailed description when read in conjunction with the appended claims and accompanying drawings, in which:

Figure 1:
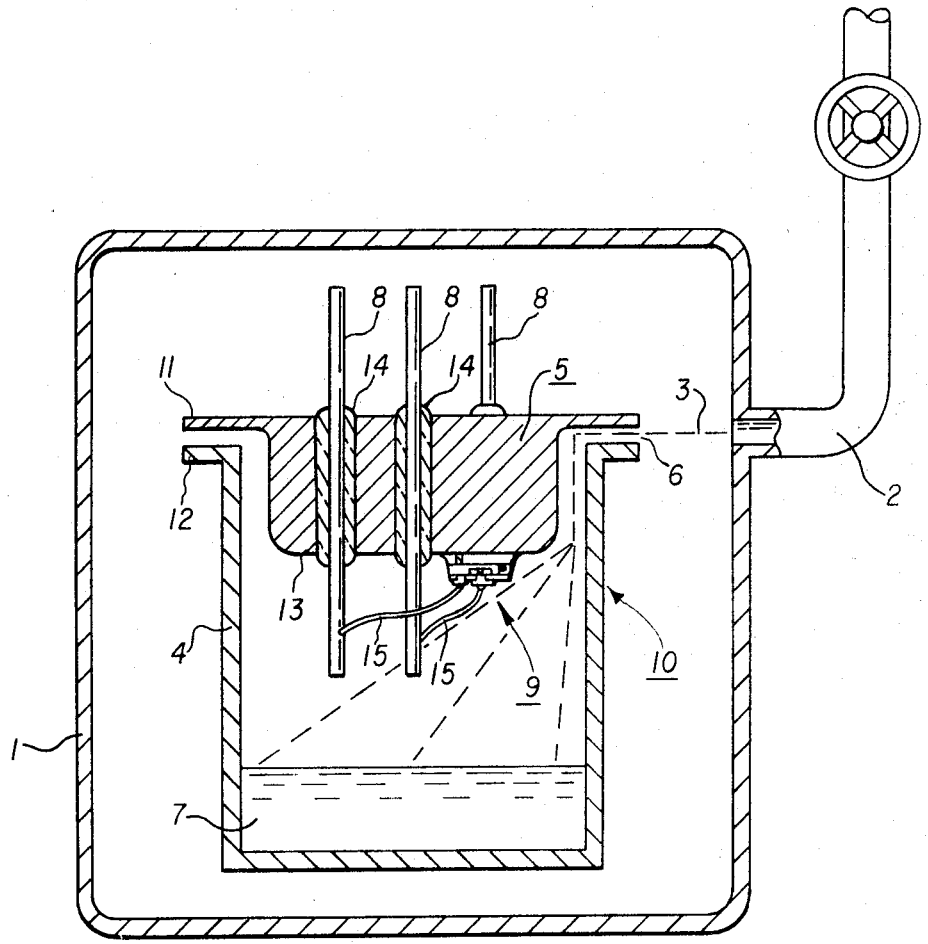
FIG. 1 shows a sectional view of an enclosed semiconductor device within a chamber for the purpose of being tested for leaks according to the invention.

Referring now to FIG. 1, the semiconductor device 10 includes a hermetically sealed envelope of which a metal can 4 and a header assembly 5 form the basic parts. These two elements 4 and 5 are joined together by conventional welding techniques, either hot or cold, along a pair of flanges 11 and 12. The semiconductor body 9, a junction transistor, for example, rests upon the header assembly 5 which comprises a metal member 13, fused glass inserts 14 and a number of metal leads 8. Fine wires 15 provide contacts between the elements of the semiconductor body 9 and the terminal leads 8. The aperture 6 between the flanges 11 and 12 will only be present in those devices which do not have a proper hermetic seal between the flanges.

Figure 3:
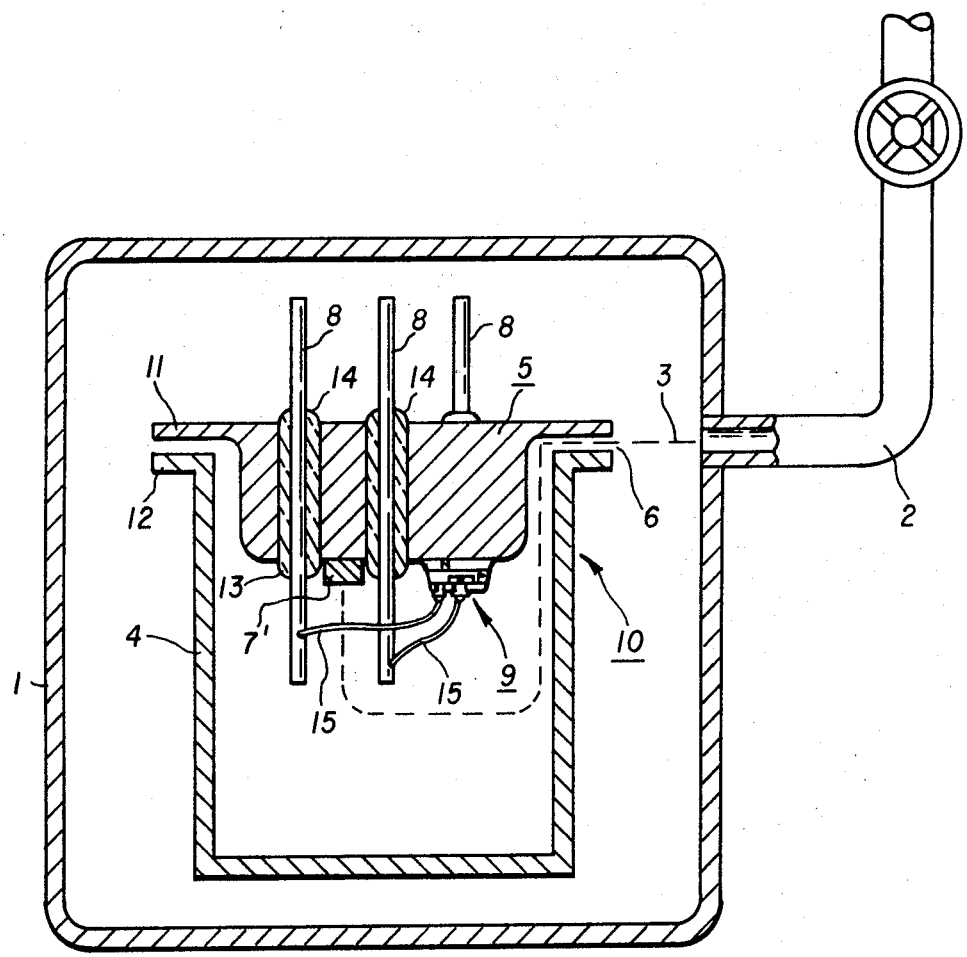
FIG. 3 shows a sectional view of another embodiment of an enclosed semiconductor device within a chamber for the purpose of testing for leaks according to the invention.

Prior to the metallic envelope 4 being secured to the header assembly 5 at the flanges 11 and 12, a getter material 7, for example, sodium aluminum silicate, which is commercially available as a molecular sieve from W. H. Curtin and Company in Houston, Texas, as type 5A, 30–50 mesh, is placed within the can 4. The getter material 7, according to the invention, is one which will entrap a radioactive tracer gas, for example, radioactive Krypton 85, should the device 10 have an improper hermetic seal 25 determined by subsequent testing to be described in more detail hereafter. The particular material 7, which is given here by way of example, is in granular form and a few grains, for example, five, can be loosely placed within the can 4, or if desired, can be in the form of a slurry as shown. Another embodiment (FIG. 3) includes the placing of the getter material 7' upon the heater assembly 5, for example, around or upon the surface of the semiconductor body 9.

Figure 2:
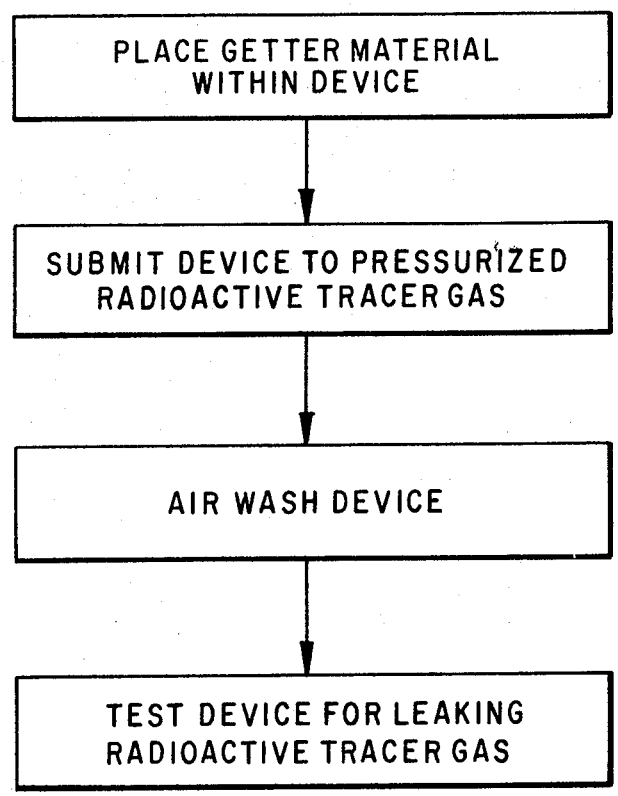
FIG. 2 shows a flow diagram for the purpose of fabricating and testing the semiconductor device of FIG. 1.

After the can member 4 is secured to the header assembly 5, the device 10 is placed in a chamber 1 and a pressurized radioactive gas 3, for example, radioactive Krypton 85, is allowed to enter the chamber 1 through a pipe 2. If the device 10 does have a defective hermetic seal at the aperture 6, for example, the gas will enter the envelope and become entrapped in the getter material 7 (7' in FIG. 3). As illustrated in the flow chart of FIG. 2, the device 10 is given an air wash to remove surface or external contamination and then placed near a scintillation counter (not shown). The gamma radiation from the radioactive gas which entered the device (if the device has a defective hermetic seal) will be emitted through the walls of the device at an intensity depending upon the amount of gas retained in the device which is governed by the composition and quantity of the getter material within the device. The radiation from the gas which is entrapped within the device can be easily differentiated from the radiation from gas absorbed on the exterior surface by the nature of the radiation. Following the air wash, the external surface is checked for beta particles with a beta measuring device. Since beta particles will not penetrate the wall 4 of the transistor so as to escape the device, a reading on the beta counter (typically a Geiger-Mueller counter) indicates external contamination. Once the external beta contamination has been removed by the air wash, the gamma radiation coming through the walls can be measured by the scintillation counter, since the absence of beta particles radiation precludes the presence of radioactive gas on the outside of the wall. This particular feature is to be contrasted with the so-called helium leak test wherein cracks or fissures on the surface of the device often absorb helium and cause erroneous readings, resulting in devices having good hermetic seals being classified as leakers.

EXAMPLES

All of the following tests were performed using sodium aluminum silicate as the getter material and the devices were subjected to radioactive Krypton 85.

TEST NO. 1

Ten particles of sodium aluminum silicate were placed inside a TO–5 can (with no header) and subjected to radioactive gas at a pressure of 60 p.s.i. for a duration of 0.1 hour. After completing the cycle, readings were taken at the surface of the open end of the can with a Geiger-Mueller counter. A header was then inserted into the can and readings were again taken at the surface of the can with the Geiger-Mueller counter. Following this, a reading was taken using the scintillation counter and data recorded.

TEST NO. 2

Five TO–5 cans were selected for the test. One particle of the getter material was placed in the one can, two particles in the second can, three particles in the third, four in the fourth and five particles in the fifth can. TO–5 headers were inserted into the cans simulating gross leakers. They were then subjected to radioactive gas at a pressure of 36 p.s.i. for 0.1 hours. Readings were taken with the scintillation counter set to detect leakage rates exceeding $1 \times 10^{-8}$ atm. cc./sec. and data recorded.

TEST NO. 3

Ten TO–18 cans were used in this test. Three particles of the getter material were placed in each can. TO–18 headers were inserted into the cans simulating gross leakers, and subjected to radioactive gas at a pressure of 37 p.s.i. for 0.1 hours. Readings were taken with the scintillation counter set to detect leakage rates exceeding $1 \times 10^{-8}$ atm. cc./sec.

TEST RESULTS

The can of Test No. 1 was identified as a gross leaker. A large amount of radioactive Krypton gas was absorbed by the particles of the molecular sieve (sodium aluminum silicate). One hundred mr., of radiation was detected at the surface of the open end of the can.

The five devices used in Test No. 2 were all detected as gross leakers, as were the 10 devices of Test No. 3. In summary, all the devices which had any amount, even one particle of the getter material, were identified as gross leakers.

These tests are to be compared with a control group wherein 20 simulated gross leakers were prepared using TO–18 cans and headers, none of which had the sodium aluminum silicate therein. After exposure to radioactive gas at a pressure of 37 p.s.i. for 0.1 hours, and with the counter set to detect leakage rates exceeding $1 \times 10^{-8}$ atm. cc./sec., the readings indicated no evidence of leakage, meaning that the gas had all escaped before the readings could be taken. Control groups were also tested using boron oxide, paint and silicon gel (all individually), none of which was satisfactory to indicate the leakers.

While the invention has been described with reference to an illustrative embodiment, it is understood that this description is not to be construed in a limiting sense. Other embodiments of the invention as well as modifications of the disclosed embodiment, will become apparent to persons skilled in the art. For example, the envelope being tested need not be restricted to semiconductor devices, but may also comprise all articles of manufacture, whether metallic or nonmetallic, which require a hermetic seal and in which a getter material is placed within the package to provide an entrapment for a radioactive tracer gas. Likewise, the semiconductor embodiment should not be construed as limited to transistors, but would be equally applicable to other semiconductor devices, for example, diodes, capacitors, resistors, integrated circuits and the like. It is thus contemplated that the appended claims will cover any such embodiment or modifications as fall within the true scope of the invention.

What is claimed is:

1. A method of fabricating a hermetically sealed package for supporting and enclosing an electronic device, such method utilizing a radioactive gas entrapping getter material for detecting hermetic seal leaks, comprising the following steps:
   a. placing a radioactive gas entrapping getter material within said package;
   b. hermetically sealing said package;
   c. subjecting said package to a pressurized radioactive tracer gas, whereby when a leak exists in said package said tracer gas enters said package through said leak and is entrapped by said getter material;
   d. air washing said package to remove external surface contaminations; and
   e. testing and measuring said package to determine the presence of particles of said tracer gas emanating therefrom; whereby
   f. the presence or absence of particles of said tracer gas emanating from said package respectively indicates a leak in said package or a satisfactory sealing of said package.

2. The method of claim 1 wherein said getter material is sodium aluminum silicate and said radioactive tracer gas is Krypton 85.

3. The method of claim 1 wherein said getter material is in granular form loosely placed within said package.

4. The method of claim 1 wherein said getter material is in slurry form and placed within said package.

5. The method of claim 1 wherein said getter material is in solid form and secured within and to said package.

* * * * *